(12) United States Patent
Jeong

(10) Patent No.: US 9,026,366 B2
(45) Date of Patent: May 5, 2015

(54) MULTI-DEVICE MAPPING FUNCTIONALITY

(75) Inventor: Eun-Hee Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 619 days.

(21) Appl. No.: 12/647,635

(22) Filed: Dec. 28, 2009

(65) Prior Publication Data

US 2010/0169010 A1 Jul. 1, 2010

(30) Foreign Application Priority Data

Dec. 29, 2008 (KR) ........................ 10-2008-0136082

(51) Int. Cl.
*G01C 21/00* (2006.01)
*G01C 21/36* (2006.01)

(52) U.S. Cl.
CPC ................... *G01C 21/3647* (2013.01)

(58) Field of Classification Search
CPC .... G01C 21/00; G01C 21/36; G01C 21/3664; G01C 21/367; G06F 15/173; G06F 3/048; G08G 1/096827
USPC ................. 701/533, 417, 117, 532, 431, 459; 725/31; 705/14.1, 80; 709/223; 700/30; 726/4; 259/330; 455/466; 250/330; 715/201, 751, 840, 784; 345/156, 184
See application file for complete search history.

(56) References Cited

U.S. PATENT DOCUMENTS

| | | | | |
|---|---|---|---|---|
| 5,796,394 A * | 8/1998 | Wicks et al. | ................... | 715/751 |
| 5,848,291 A * | 12/1998 | Milne et al. | ................... | 715/201 |
| 7,224,991 B1 * | 5/2007 | Fuoss et al. | ................... | 455/466 |
| 7,847,251 B1 * | 12/2010 | Praly | ................... | 250/330 |
| 7,894,836 B1 * | 2/2011 | Fuoss et al. | ................... | 455/466 |
| 8,010,285 B1 * | 8/2011 | Denise | ................... | 701/417 |
| 8,148,687 B1 * | 4/2012 | Praly | ................... | 250/330 |
| 2005/0114711 A1 * | 5/2005 | Hesselink et al. | ............ | 713/201 |
| 2005/0177304 A1 * | 8/2005 | Tu | ................... | 701/211 |
| 2006/0069503 A1 * | 3/2006 | Suomela et al. | ............. | 701/211 |
| 2007/0126698 A1 * | 6/2007 | Iwamoto et al. | ............. | 345/156 |
| 2007/0192020 A1 * | 8/2007 | Brulle-Drews et al. | ....... | 701/200 |
| 2007/0226646 A1 * | 9/2007 | Nagiyama et al. | .......... | 715/784 |
| 2007/0293958 A1 * | 12/2007 | Stehle et al. | ................... | 700/30 |
| 2008/0104630 A1 * | 5/2008 | Bruce et al. | ................... | 725/31 |
| 2008/0229249 A1 * | 9/2008 | Lau et al. | ................... | 715/840 |

(Continued)

FOREIGN PATENT DOCUMENTS

JP 2008-014881 A 1/2008
KR 10-2008-0013475 2/2008

OTHER PUBLICATIONS

Korean Office Action dated Mar. 10, 2015 for Korean Application No. 10-2008-0136082 , 5 pages.

*Primary Examiner* — Helal A Algahaim
*Assistant Examiner* — Yuri Kan
(74) *Attorney, Agent, or Firm* — Fish & Richardson P.C.

(57) ABSTRACT

Route information for a route from a departure location to a destination location is generated. The generated route information is displayed on a first display of a first device. User input based upon the route information displayed on the first display of the first device is received at the first device. Route media is generated at the first device in response to the received user input. The generated route media is different than the route information displayed on the display of the first device. The generated route media is transmitted from the first device to a second device. The second device includes a second display.

11 Claims, 6 Drawing Sheets

(56) References Cited

U.S. PATENT DOCUMENTS

| | | | |
|---|---|---|---|
| 2008/0244050 A1* | 10/2008 | Wong et al. | 709/223 |
| 2008/0275645 A1* | 11/2008 | Hoshino | 701/209 |
| 2008/0303803 A1* | 12/2008 | O'Brien et al. | 345/184 |
| 2009/0024314 A1* | 1/2009 | Kim | 701/200 |
| 2009/0099972 A1* | 4/2009 | Angert et al. | 705/80 |
| 2010/0169010 A1* | 7/2010 | Jeong | 701/209 |
| 2011/0022308 A1* | 1/2011 | Britton | 701/202 |
| 2011/0106592 A1* | 5/2011 | Stehle et al. | 705/14.1 |
| 2011/0112750 A1* | 5/2011 | Lukassen | 701/200 |
| 2012/0035839 A1* | 2/2012 | Stehle et al. | 701/117 |

\* cited by examiner

MULTI-DEVICE MAPPING FUNCTIONALITY

CROSS-REFERENCE TO RELATED APPLICATION

Pursuant to 35 U.S.C. §119(a), this application claims the benefit of the earlier filing date and right of priority to Korean Application No. 10-2008-0136082, filed on Dec. 29, 2008, the contents of which is incorporated by reference herein in its entirety.

BACKGROUND

Navigation devices can be used to provide mapping and routing information to users. In-vehicle navigation devices or portable navigation devices can be used to provide driving directions while a user traverses a route. Many such navigation systems rely upon Global Positioning System (GPS) functionality to determine the location of the vehicle and use the determined location in providing driving directions.

SUMMARY

In general, in some aspects, a method includes generating route information for a route from a departure location to a destination location and displaying the generated route information on a first display of a first device. The method also includes receiving, at the first device, user input based upon the route information displayed on the first display of the first device. The method further includes generating route media at the first device in response to the received user input. The generated route media is different than the route information displayed on the display of the first device. In addition, the method includes transmitting the generated route media from the first device to a second device. The second device includes a second display.

This and other implementations can optionally include one or more of the following features, which also may optionally be in any combination. The method can further include receiving the route media transmitted from the first device at the second device and displaying the received route media on the second display of the second device. Generating route media can include generating a video pertaining to the route. The video can be in an avi, mpeg, or mov video format. Receiving the user input can include receiving a selection of a section of the route and generating route media can include generating route media specific to the selected section of the route.

Also, generating route media can include generating video information that is refreshed dynamically based upon changes in the route. The dynamically refreshed video information can include a larger number of screens for portions of the route with turns than for portions of the route without turns. The method may further include receiving global positioning system information. Generating route media can include generating video information based upon the received global positioning system information. The method can additionally include receiving the route media transmitted from the first device at the second device and displaying the received route media and the received global positioning system information on the second display of the second device. The first device can be a mobile communication terminal or a telematics terminal. The second device can be a mobile communication terminal or a telematics terminal.

In other implementations, some aspects include a system including a first display unit of a first device, user input controls of the first device, and a communication module configured to transmit information from a first device to a second device. The system also includes a controller of the first device configured to generate route information for a route from a departure location to a destination location and to display the generated route information on the first display. The controller is also configured to receive user input based upon the route information displayed on the first display with the user input controls and to generate route media in response to the received user input. The generated route media is different than the route information displayed on the first display. The controller is further configured to transmit the generated route media from the first device to a second device with the communication module, wherein the second device includes a second display.

This and other implementations can optionally include one or more of the following features, which also may optionally be in any combination. The system can also include a controller of the second device is configured to receive the route media transmitted from the first device at the second device and to display the received route media on the second display of the second device. To generate the route media, the controller of the first device can be configured to generate a video pertaining to the route. The video can be in an avi, mpeg, or mov video format. To receive the user input, the controller of the first device can be configured to receive a selection of a section of the route and to generate the route media, the controller of the first device can be configured to generate route media specific to the selected section of the route.

Moreover, to generate the route media, the controller of the first device can be configured to generate video information that is refreshed dynamically based upon changes in the route. The dynamically refreshed video information can include a lager number of screens for portions of the route with turns than for portions of the route without turns. The controller of the first device can be configured to receive global positioning system information. To generate the route media, the controller of the first device can be configured to generate video information based upon the received global positioning system information. The controller of the second device can be configured to receive the route media transmitted from the first device and display the received route media and the global positioning system information on the second display of the second device. The first device can be a mobile communication terminal or a telematics terminal. The second device can be a mobile communication terminal or a telematics terminal.

The foregoing and other objects, features, aspects and advantages will become more apparent from the following detailed description when taken in conjunction with the accompanying drawings.

BRIEF DESCRIPTION OF THE DRAWINGS

Like reference symbols in the various drawings indicate like elements.

DETAILED DESCRIPTION

Figure 1:
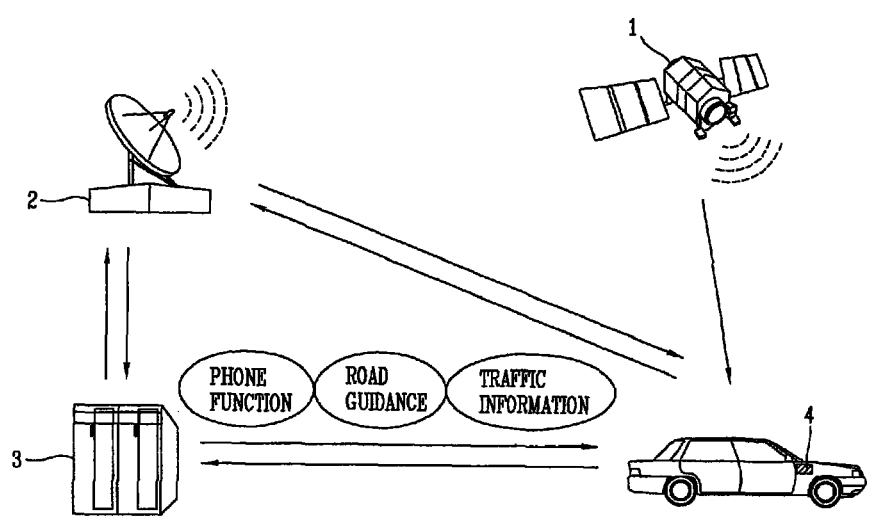
FIG. 1 is a diagram of a navigation system.

FIG. 1 is a diagram of a navigation system including an information providing center 3, a car navigation apparatus 4 mounted inside a car, and a wireless communication network 2. The car navigation apparatus 4 is configured to receive traffic information via the wireless communication network 2 and GPS signals via a satellite 1. The car navigation apparatus 4 then uses the received traffic information and GPS signal to provide mapping and routing information to a user. The receipt of the traffic information and GPS signals and the providing of mapping and routing information to a user can be conducted according to the techniques described in further detail below.

Figure 2:
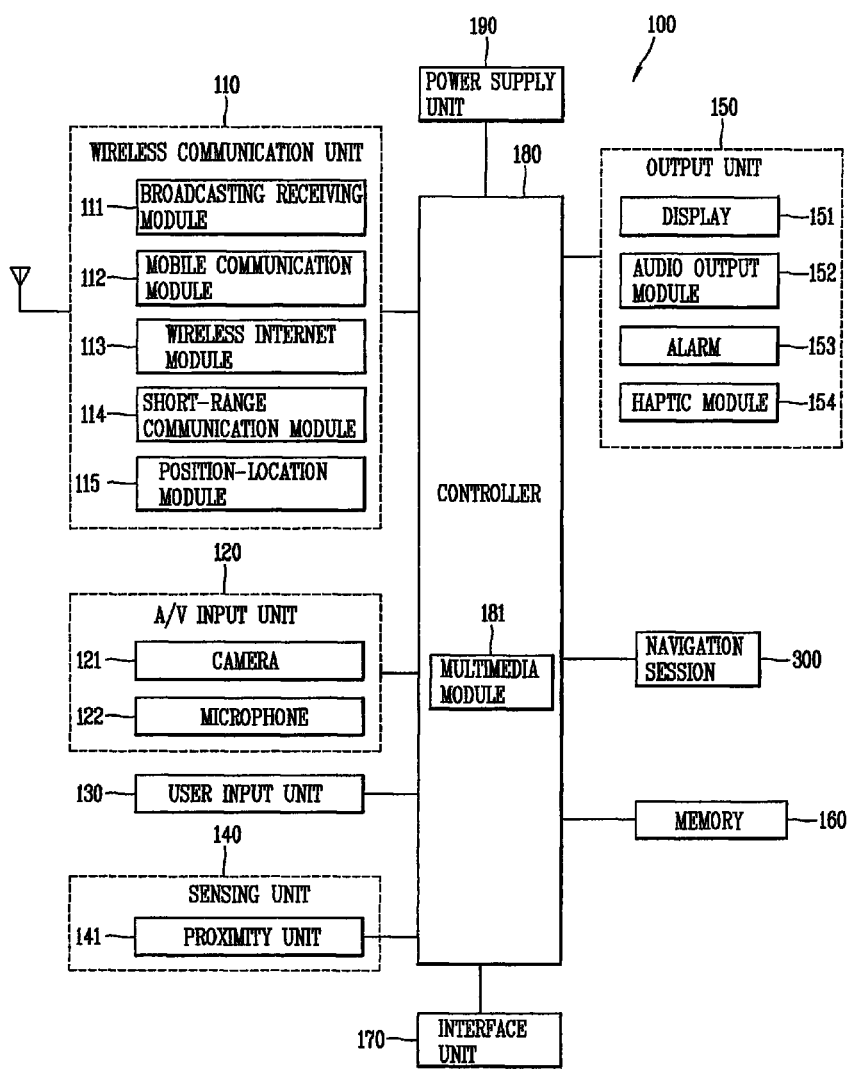
FIG. 2 is a block diagram of a mobile communication terminal having a navigation apparatus.

FIG. 2 is a block diagram showing construction of a mobile communication terminal 100 including a navigation apparatus 300. The mobile communication terminal 100 may be implemented as a stand alone device or in combination with other devices. For example, the mobile communication terminal 100 may be implemented with a portable phone, smart phone, notebook computers, digital broadcasting terminal, personal digital assistants (PDA), portable multimedia players (PMP), navigators (car navigation apparatuses), or another type of device.

As shown in FIG. 2, the mobile communication terminal 100 may include a wireless communication unit 110, an Audio/Video (A/V) input unit 120, a user input unit 130, a sensing unit 140, an output unit 150, a memory 160, an interface unit 170, a controller 180, a power supply unit 190, and other components. The mobile communication terminal 100 may be used as the car navigation apparatus 4 along with or separate from the other components of FIG. 1.

The wireless communication unit 110 may include one or more modules which permit wireless communication between the portable terminal 100 and a wireless communication system or between the portable terminal 100 and a network within which the portable terminal 100 is located. For example, the wireless communication unit 110 may include a broadcast receiving module 111, a mobile communication module 112, a wireless internet module 113, a short-range communication module 114, a position location module 115, or other components.

The broadcast receiving module 111 can receive a broadcast signal and/or broadcast associated information from an external broadcast managing entity via a broadcast channel. The broadcast channel may include a satellite channel and a terrestrial channel. The broadcast managing entity may include a server that generates and transmits a broadcast signal and/or broadcast associated information and may include a server that receives a pre-generated broadcast signal and/or broadcast associated information and sends the received signal and/or information to a portable terminal. The broadcast signal may be implemented as a TV broadcast signal, a radio broadcast signal, a data broadcast signal, or as another signal. The broadcast signal may further include a data broadcast signal combined with a TV or radio broadcast signal.

The broadcast associated information may be provided via a mobile communication network and received by the mobile communication module 112. The broadcast associated information may be implemented in various formats. For example, broadcast associated information may be implemented according to Electronic Program Guide (EPG) of Digital Multimedia Broadcasting (DMB), Electronic Service Guide (ESG) of Digital Video Broadcast-Handheld (DVB-H), or other formats.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), or other broadcast systems. The broadcast receiving module 111 may be configured to be suitable for broadcast systems transmitting broadcast signals as well as digital broadcasting systems. Broadcast signals and/or broadcast associated information received via the broadcast receiving module 111 may be stored in memory 160.

The mobile communication module 112 transmits and receives wireless signals to and from at least one of network entity (e.g., a base station, an external portable terminal, a server, etc.) on a mobile communication network. Here, the wireless signals may include audio call signal, video (telephony) call signal, or various formats of data according to transmission/reception of text/multimedia messages.

The wireless internet module 113 supports wireless Internet access for the portable terminal. This module may be internally or externally coupled to the portable terminal 100.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, or other technology.

The position location module 115 denotes a module for detecting or calculating a position of a portable terminal. An example of the position location module 115 may include a GPS module. The GPS module can measure time and distance with respect to satellites so as to accurately calculate a current position of the mobile terminal based on such three different distances according to a triangulation scheme. In particular, the a scheme may be used to obtain time information and distance information from three satellites and to correct error by one satellite. Also, the GPS module may measure three-dimensional speed information and accurate time as well as a position based upon latitude, longitude, and altitude, from the distance received with the satellites. Examples of the location information module 115 may include Wi-Fi positioning system and/or hybrid positioning system.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or other modes. This audio signal is processed into digital data. In implementations using mobile telephone systems, the processed digital data can be converted for output into a format transmittable to a mobile communication base station via the mobile communication module 112. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch, or other input mechanisms. For example, a touch screen can be used. The touch screen includes a touchpad layered with the display 151 for cooperation with the display 151, as described in more detail below.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140, sensing the presence or absence of power provided by the power supply 190, the presence or absence of a coupling or other connection between the interface unit 170 and an external device, or other sensing functions.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, or other interfaces.

The identification module may be configured as a chip for storing various information required to authenticate an authority to use the mobile terminal 100. The information may include a User Identity Module (UIM), a Subscriber Identity Module (SIM), a Universal Subscriber Identity Module (USIM), or other modules. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

The output unit 150 is configured to output an audio signal, a video signal or an alarm signal. The output unit 150 may include a display 151, an audio output module 152, an alarm 153, or other components.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured with the display 151 and the touchpad layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The mobile terminal 100 may include two or more of such displays 151. For example, the mobile terminal 100 may include an external display (not shown) and an internal display (not shown).

The audio output module 152 may output audio data which is received from the wireless communication unit 110 in various modes. The modes may include a call-receiving mode, call-placing mode, recording mode, voice recognition mode, broadcast reception mode, or other modes. The audio output module 152 may output audio data stored in the memory 160. In addition, the audio output module 152 may output an audio signal relating to a particular function (e.g., call received, message received, etc.) of the mobile terminal 100. The audio output module 152 may be implemented using, for example, a speaker or a buzzer.

The alarm 153 may output a signal to inform the user of an event associated with the mobile terminal 100. Typical events may include a received call, received message, or received user input. In addition to generating the audio or video signal, the alarm 153 also may inform the user of the generation of an event in different manners, for example, by providing tactile sensations (e.g., vibration) to a user. Moreover, the alarm 153 may be configured to vibrate in responsive receipt of a call or message by the mobile terminal 100. As another example, vibration is provided by the alarm 153 in response to receiving user input at the mobile terminal 100, thus providing a tactile feedback mechanism. Such vibration can also be provided to make a user recognize the generation of an event. The signal informing the generation of the event may be outputted via the display 151 or the audio output module 152.

The memory 160 may store a program for the processing and control of the controller 180. Alternatively, the memory 160 may temporarily store input/output data (e.g., phonebook data, messages, still images, video).

The memory 160 can be implemented using any type of suitable storage medium, such as, for example, flash memory, a hard disk, a multimedia card micro, a memory card (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk. Also, the mobile terminal 100 may operate a web storage which performs the storage function of the memory 160 on the Internet.

The controller 180 typically controls the overall operations of the mobile terminal. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component.

The power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In various implementations, techniques described below are implemented by the controller 180. For software implementation, the techniques described below may be implemented together with separate software modules each of which performs at least one of functions and operations. The software codes can be implemented with a software application written in any suitable programming language. Also, the software codes may be stored in the memory 160 and executed by the controller 180.

A navigation apparatus 300 applied to the mobile communication terminal 100 may be configured to display navigation information (road guidance information). The navigation apparatus 30 can display a navigation map on a display unit, generate video information based upon the navigation information relating to a preset section, transmit information to another apparatus via a wired/wireless communication network, and receive video information corresponding to the navigation information transmitted from another apparatus.

For example, the navigation apparatus 300 applied to the mobile communication terminal 100 can match a current position with a current map match link extracted from map data indicative of a travel route from a departure point to a destination (or with a current travel route without a destination). Also, the navigation apparatus 300 can output navigation information based upon the matched result. In addition, the navigation apparatus 300 can display navigation information, such as, a navigation map on a display unit and can generate video information based upon the navigation information relating to a preset section. As such, the navigation apparatus 300 can transmit the video information to another apparatus via a wired or wireless communication network or receiving video information conformable to the navigation information transmitted from another apparatus.

Figure 3:
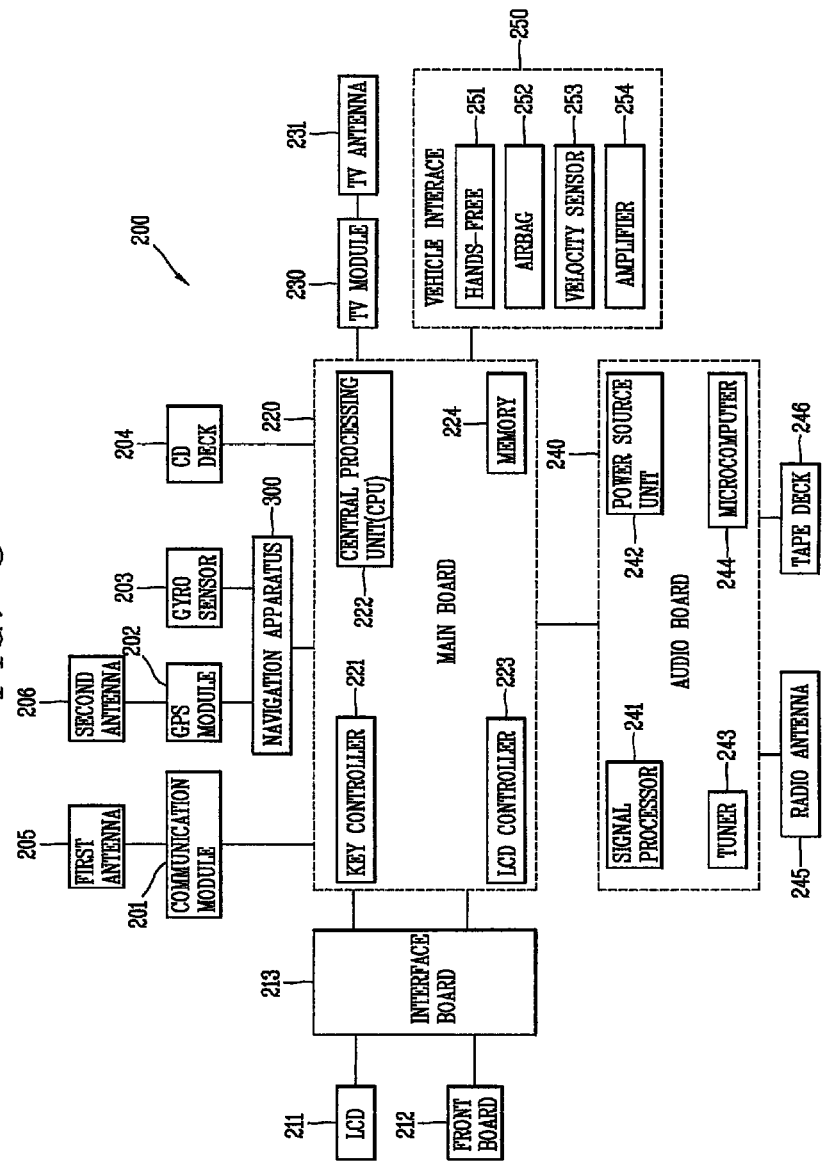
FIG. 3 is a block diagram of a telematics terminal having a navigation apparatus.

FIG. 3 is a block diagram of a telematics terminal 200 having a navigation apparatus 300. The telematics terminal 200 may include a main board 220 with a central processing unit (CPU) 222 for controlling the overall operations of the telematics terminal 200, a key controller 221 for controlling various types of key signals, a liquid crystal display (LCD) controller 223 for controlling an LCD, and a memory 224 for storing various information.

The memory 224 may store map data for displaying navigation information on a digital map. Also, the memory 224 may store a traffic information gathering control algorithm that allows input of traffic information according to road conditions in which a vehicle is currently driven and may store various other information for controlling the algorithm.

The main board 220 may include a communication module 201 with a specific device number assigned so as to execute voice communication and data transmission and reception via a mobile communication terminal embedded in a vehicle. Also, the main board 220 may include a GPS module 202 for receiving GPS signals for location guidance of vehicle, travel route search from a departure point to a destination, and generation of current location data of the vehicle based upon the received GPS signal. In some implementations, the GPS module 202 is configured to transmit traffic information gathered by a user, a gyro sensor 203 for detecting a traveling direction of the vehicle, a compact disc (CD) deck 204 for reproducing signals recorded in the CD, or other information. The communication module 201 and the GPS module 202 may receive signals via first and second antennas 205 and 206.

Also, the main board 220 may be connected to a TV module 230 for receiving broadcast signals via an antenna for broadcast signal (or TV antenna) 231. The main board 220 also may be connected to an LCD 211 controlled by the LCD controller 223 via an interface board 213.

After executing signal-processing for a broadcast signal received via the TV module 230, the signal-processed broadcast signal is displayed on the LCD 211 in a format of video signal via the interface board 213 under the control of the LCD controller 223, and an audio signal is output via an amplifier 254 under the control of an audio board 240. Also, the LCD 211 may display various types of video signals, text signals, and the like based upon a control signal of the LCD controller 223. Further, the LCD 211 may be configured as a touch screen so as to receive a user input.

The main board 220 may be connected to a front board 212 by the key controller 221 via the interface board 213. The front board 212 can include buttons and menus for allowing various key signal inputs and can provide the main board 220 with a key signal responsive to a key or button selected by a user. Also, the front board 212 can include a menu key allowing direct input of traffic information. The menu key may be configured to be controlled by the key controller 221. The audio board 240 may be connected to an antenna 245 for receiving a radio signal, and a tape deck 246 for reproducing an audio tape. The audio board 240 also may be connected to the amplifier 254 for outputting an audio signal processed in the audio board 240.

The amplifier 254 may be connected to a vehicle interface 250. The main board 220 and the audio board 240 may be connected to the vehicle interface 250. The vehicle interface 250 may allow connection of a hands-free device 251, an airbag 252 for passenger's safety, a velocity sensor 253 for detecting velocity of the vehicle, or other devices. The velocity sensor 253 may measure the velocity of the vehicle and provide the same to the CPU 222.

The navigation apparatus 300 can be configured to display navigation information (e.g., a navigation map on a display unit), generate video information based upon the navigation information relating to a preset section to transmit to another apparatus via a wired/wireless communication network, or receive video information corresponding to the navigation information transmitted from another apparatus.

For example, the navigation apparatus 300 may match a current position with a current map match link extracted from map data indicative of a travel route from a departure point to a destination (or a current travel route without a destination), and output navigation information based upon the matched result. Also, the navigation apparatus 300 may display navigation information (e.g., a navigation map on a display unit) and may generate video information based upon the navigation information relating to a preset section. The navigation apparatus 300 may transmit the video information to another apparatus via a wired or wireless communication network or receive video information conformable to the navigation information transmitted from another apparatus.

Functions of the navigation apparatus 300 may be executed in the navigation apparatus 300 itself or may be performed by the CPU 212 of the telematics terminal 200. However, for brevity, description below assumes that the navigation apparatus 300 is applied to the telematics terminal 300 with reference to FIG. 4. Here, the navigation apparatus 300 may be applied to a mobile communication terminal 100 as well as the telematics terminal 200.

Figure 4:
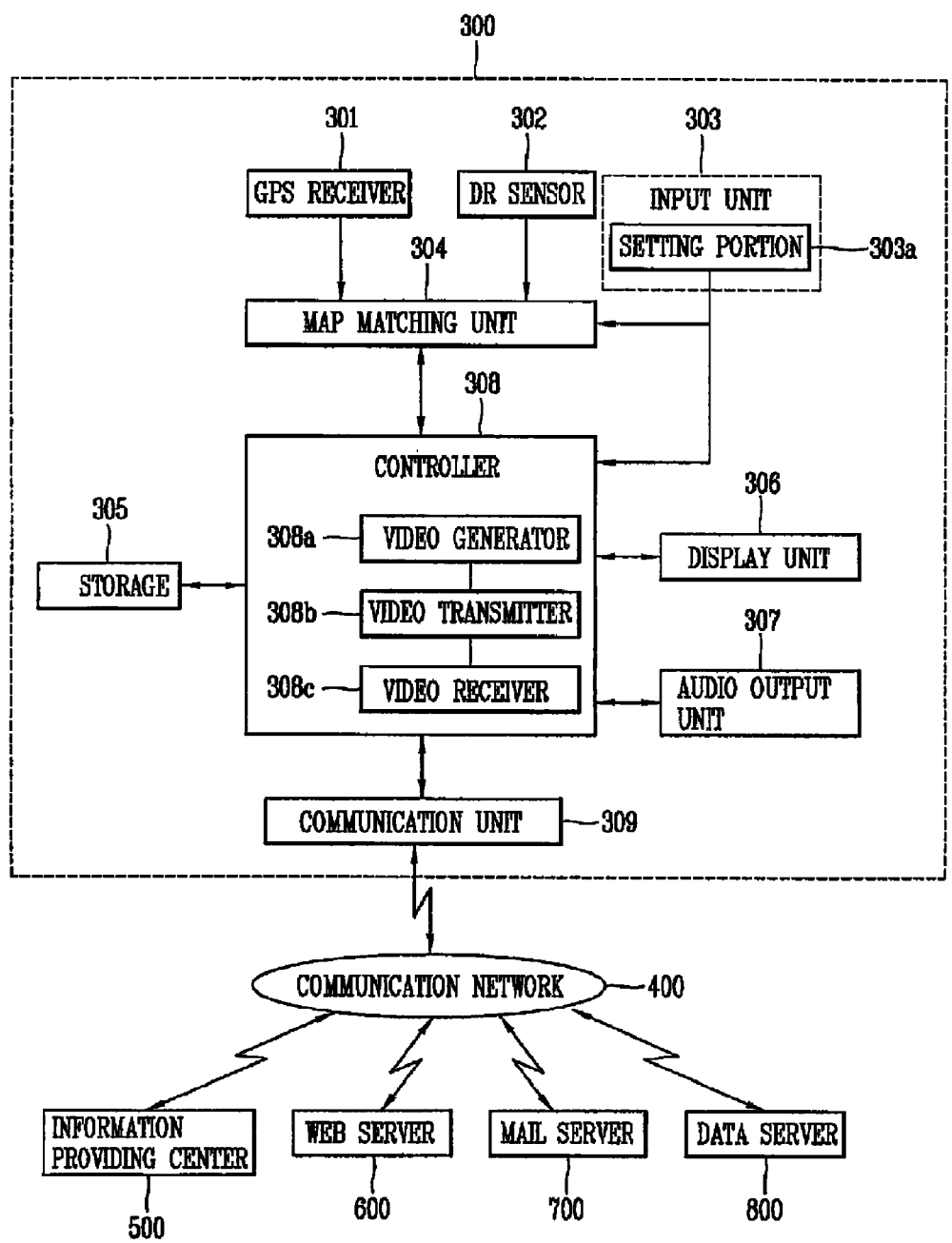
FIG. 4 is a block diagram of a navigation apparatus.

FIG. 4 is a block diagram of a navigation apparatus. The navigation apparatus may include a GPS receiver 301 for receiving a GPS signal from a satellite to generate location data (which may be the same location as the telematics terminal 200 or mobile communication terminal 100 having the navigation apparatus) based upon the received GPS signal. The navigation apparatus can also include a dead-reckoning (DR) sensor 302 for detecting a driving direction of vehicle and velocity of the vehicle, an input unit 303 for allowing input of information or data from the exterior, and a storage 305 for storing map data. The navigation apparatus can further include a map matching unit 304 for generating an estimated location of the vehicle based upon the vehicle location data, matching the vehicle estimated location with a link (map-matched link or map-matched road) within the map data stored in the storage 305 and for outputting the matched map information (map-matched result). In addition, the navigation apparatus can include a controller 308 for generating navigation information based upon the matched map information and for receiving real-time traffic information from an information providing center 500.

Moreover, a display unit 306 can be included in the navigation apparatus to display a navigation map included in the navigation information and an audio output unit 307 can be included in the navigation apparatus for outputting audible navigation information (e.g., voice guidance message) included in the navigation information. The controller 308 may be configured to generate video information based upon the navigation information relating to a preset section for transmission to another apparatus via a wired or wireless communication network or for recipient of video information conformable to the navigation information transmitted from another apparatus. Also, the navigation apparatus 300 may further include a hands-free module, which may have a BLUETOOTH function.

Figure 5:
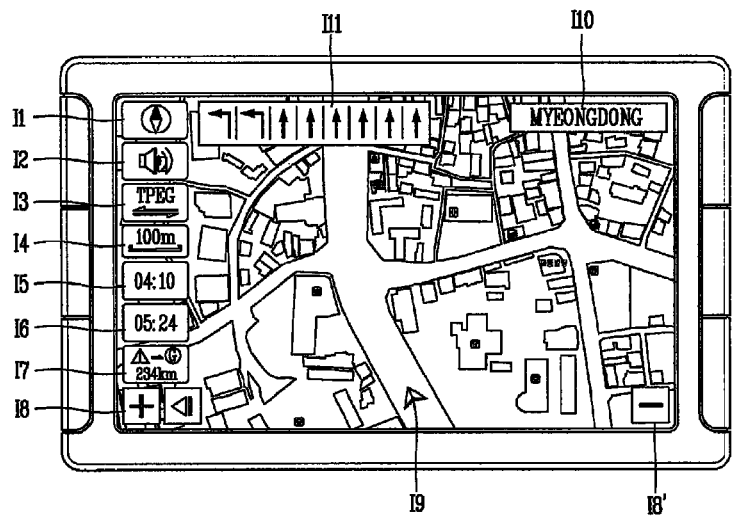
FIG. 5 is a screen of a display unit of a navigation apparatus.

FIG. 5 is a screen of a display unit of a navigation apparatus. The screen of FIG. 5 may be displayed differently or with fewer components if displayed using a mobile phone, smart phone, notebook computer, digital broadcasting terminal, PDA, PMP, or another portable device.

As shown in FIG. 5, the display unit 306 may display an icon I1 which indicates an orientation of a map displayed on one region of the screen. The display unit 306 may display a map such that the upward direction of the screen corresponds to a specific direction (e.g., a true-north direction of the Earth), a proceeding direction of a mover, or a direction toward a destination.

The display unit 306 may display an icon I2 which indicates activation or deactivation of an audio output module 162 and a volume setting on one region of the screen. A user may activate or deactivate the audio output module 162 or adjust the volume in a manner of touching the icon I2. The display unit 306 may display an icon I3, on one region of the screen, which indicates whether or not a route search function using a transport portal experts group (TPEG) has been activated. TPEG is a route guidance function using real-time traffic information in a navigation system. The display unit 306 may display an icon I4 which indicates a scale of the map data on one region of the screen.

The display unit 306 may display an icon I5 which indicates a current time on one region of the screen and an icon I6 which indicates an expected arrival time to get a preset destination. In addition to this, an icon for indicating an expected travel time to reach a preset destination (not shown) may further be displayed. The display unit 306 may display an icon I7 which indicates a remaining distance up to a preset destination on one region of the screen. The display unit 306 may display a zoom-in or zoom-out icon I8 or I8' which allows enlarging or reducing of a displayed map on one region of the screen.

The display unit 306 also may display an icon I9 which indicates a location of a mover (e.g., car) and a proceeding direction thereof on one region of the screen. The icon I9 may be represented on a point corresponding to the current location of the mover on the map. The proceeding direction of the mover indicated by the icon I9 may be represented in a direction that an apex of an arrow faces. The display unit 306 may display an icon I10 which indicates a name of a region at which a mover is located. The display unit 306 may display an icon I11 which indicates traffic lanes of a roadway if the mover travels on the roadway.

The display unit 306 may display a route required for reaching a preset destination. The route may not be represented when a destination of a mover is not set. The controller 308 configured in the navigation apparatus 300 may generate video information based upon the navigation information relating to a preset section for transmission to another apparatus via a wired or wireless communication network or for receipt of video information corresponding to navigation information transmitted from another apparatus. Therefore, the navigation apparatus 300 may be configured to display navigation information (e.g., a navigation map on a display unit) and to generate video information based upon the navigation information relating to a preset section for transmission to another apparatus via a wired/wireless communication network or for receipt of video information corresponding to the navigation information transmitted from another apparatus Here, the GPS receiver 301 may function as the GPS module 207 of the telematics terminal and the storage 305 may be conformable to the memory 213 of the telematics terminal. Also, the display unit 306 may be the LCD 201 of the telematics terminal and the audio output unit 307 may be the amplifier 226 of the telematics terminal. Further, the functions of the map matching unit 304 and the controller 308 may be performed by the CPU 212 of the telematics terminal.

The GPS receiver 301 may receive a GPS signal from a satellite when a navigation mode (e.g., road guidance) is selected. Location information of the vehicle may alternatively be received via a Wi-Fi or wibro communication with the GPS receiver 301. The DR sensor 302 may generate vehicle location data, such as a driving direction of vehicle, velocity of the vehicle or other data, and can output the vehicle location data to the map matching unit 304. The map matching unit 304 may generate an estimated vehicle location based upon the vehicle location data, match the generated estimated location with the map data, and output the matched map information (map-matched result) to the controller 308. For example, the map matching unit 304 may measure the estimated vehicle location based upon the vehicle location data, match the measured estimated location of the vehicle with links within the map data stored in the storage 305 in the order of the links, and output the matched map information (map-matched result) to the controller 308.

The controller 308 may generate navigation information based upon the matched map information and output the generated navigation information to the display unit 306 and the audio output unit 307. Here, the audio output unit 307 may be a speaker. The controller 308 also may display the navigation information (e.g., a navigation map on the display unit 306), transmit video information which is generated conformable to the navigation information, or receive video information conformable to navigation information transmitted from another apparatus.

The video information may include a video outline map. That is, upon setting a departure point and a destination, a route from the departure point to the destination is selected, and the selected route is displayed on the display unit 306. If a user sets a specific section by a setting portion 303a, the controller 308 generates a video outline map conformable to the set section. Here, the specific section may be a route from the departure point to the destination, a partial section of the route from the departure point to the destination, or partial or entire navigation screen which changes along the route from the departure point to the destination. The video information may include a video outline map configured by including screens with such several sections of the route. Also, the video outline map may be generated by consecutively storing the sections of the route for a preset time or periodically storing the same.

The video outline map may be generated by sensing changes in the screens including the sections of the route. Namely, screens including the sections with significant changes may be consecutively stored, and screens without significant changes are partially excluded and partially stored, thereby generating the video outline map. For example, in the video outline map, for sections which exhibit less change in the screens (such as a direct or progressing section), only a part of screens for the advancing section may be stored. In contrast, for sections which exhibit great changes in the screens (such as intersections or curves), consecutive screens may be stored. Accordingly, a user of the video information can easily obtain navigation information from the video information that is quickly reproduced at the advancing section and slowly reproduced at the curved sections or the intersections.

Also, the video information may include audible navigation information. That is, the video information may include a voice announcement at a point to be guided (e.g., "Turn right" or "Be careful of sharp curve"). By providing such audible navigation information, an accurate guidance may be achieved compared to simply showing a map on a screen.

Further, the video information may include GPS information. Upon transmitting the video information including the GPS information, another system having received the video information may display navigation information conformable to a current location on a screen by utilizing the received GPS information. The video information may include two or more video outline maps shown concurrently and may include a voice indication or GPS information. The setting portion 303a may be provided in the input unit 303 of FIG. 4 or elsewhere.

The navigation apparatus may include a video generator 308a for generating video information based upon navigation information relating to a set section and may include a video transmitter 308b for transmitting the video information to another apparatus. That is, if a user enters a video generation start command via the setting portion 303a, the video generator 308a can, in response, generate video information based upon the navigation information conformable to a set section. The generated video information is then transmitted to another apparatus according to a video transmission command input via the setting portion 303a.

The navigation apparatus may further include a video receiver 308c for receiving transmitted video information from another system or apparatus. The received video information may be displayed on a screen via the display unit 306. The video generator 308a, the video transmitter 308b and the video receiver 308c can be included in the controller 308 or independently disposed. The other apparatus or system from which the transmitted video information is received can also be an apparatus for executing the video information, such as another mobile communication terminal, another telematics terminal, or another navigation apparatus. Also, examples of the other apparatus may include one or more of web server 600, mail server 700, data server 800, and information providing sensor 500. Video information transmitted to one or more of the apparatuses may be retransmitted to other systems or apparatuses connected to each of the apparatuses. For instance, when video information is transmitted to the mail server 700 for storage, users of the mail server 700 may acquire the video information from the mail server 700. Also, the video information may be transmitted directly to pre-registered (pre-assigned) other apparatus users or system users. For instance, if other apparatus or system users are pre-registered in the storage 305, the video information may be transmitted directly to the pre-registered users.

Further, examples of the wired or wireless communication networks may include a broadcast receiving module, mobile communication module, wireless internet module, short-range communication module, position information module, universal serial bus (USB), parallel bus and the like. The storage 305 may store the generated video information.

A navigating method of the navigation apparatus may include generating video information on the basis of navigation information relating to a set section (S400) and transmitting the video information to another apparatus via a wired or wireless communication network (S500). Here, the construction of the apparatus can be understood with reference to FIGS. 4 and 5.

The generating of the video information (S400) generates video information based upon navigation information conformable to a set section. In particular, the generated video information can relate to a specific section included in the navigation information when a user sets the corresponding section. The video format can be various video formats, such as, avi, mpeg, or other formats. The set specific section may be one of a route from a departure point to a destination, a partial section of a route from a departure point to a destination, or part or all of a navigation screen which changes along a route from a departure point to a destination.

Here, the video information also may include a video outline map. That is, when a departure point and a destination are selected, a route from the departure point to the destination is selected among a plurality of routes therebetween, and the selected route is displayed on the display unit 306. Here, if a user sets a specific section via the setting portion 303a, video information corresponding to the set section is generated. Here, the specific section may be one of the route from the departure point to the destination, a partial section of the route from the departure point to the destination, or part or all of a navigation screen which changes along the route from the departure point to the destination. The video information may include a video outline map formed by screens including such sections of the route. The video outline map may be generated by consecutively storing the sections of the route for a specific time or periodically storing the sections.

Alternatively, the video outline map may be generated by sensing changes of screens including the sections, namely, generated by consecutively storing screens with significant changes while partially storing and partially not storing screens without significant changes. For instance, for the sections including screens without significant changes, such as an advancing section, the video outline map is generated by storing part of the advancing screens. On the other hand, for the sections including screens with significant changes, such as intersections or curves, the video outline map is generated by consecutively storing the screens. Accordingly, the user using the video information can quickly and easily acquire navigation information from the video information that is quickly reproduced at the advancing section and slowly reproduced at curves or intersections.

Also, the video information may include audible navigation information. That is, the video information may include a voice indication (e.g., "Turn Right") at a point to be guided. The video information may include GPS information. Upon transmitting the video information including the GPS information, another system having received the video information may display navigation information conformable to a current location on a screen by utilizing the received GPS information. In addition, the video information may simultaneously include two or more of the video outline map, the voice indication information, or the GPS information.

The transmitting of the video information (S500) transmits the generated video information to another apparatus via a wired or wireless communication network. That is, if a user enters a video generation start command via the setting portion 303a, the video generator 308a generates video information based upon the navigation information conformable to a set section. The generated video information is then transmitted to another apparatus according to a video transmission command input via the setting portion 303a.

Here, the other apparatus or system is an apparatus for executing the video information which it has received, and may be another mobile communication terminal, another telematics terminal or another navigation apparatus. Also, the other apparatus may include one or more of a web server 600, a mail server 700, a data server 800 or an information providing sensor 500. Video information transmitted to one or more of the apparatuses may be retransmitted to other systems or apparatuses connected to each of the apparatuses. For instance, when video information is transmitted to the mail server 700 for storage, users of the mail server 700 may acquire the video information from the mail server 700. Also, the video information may be transmitted directly to pre-registered (pre-assigned) other apparatus users or system users. For instance, if other apparatus or system users are pre-registered in the storage 305, the video information may be transmitted directly to the pre-registered users.

Further, the wired or wireless communication networks may include a broadcast receiving module, mobile communication module, wireless internet module, short-range communication module, position information module, universal serial bus (USB), parallel bus, or other means of communication.

Figure 6:
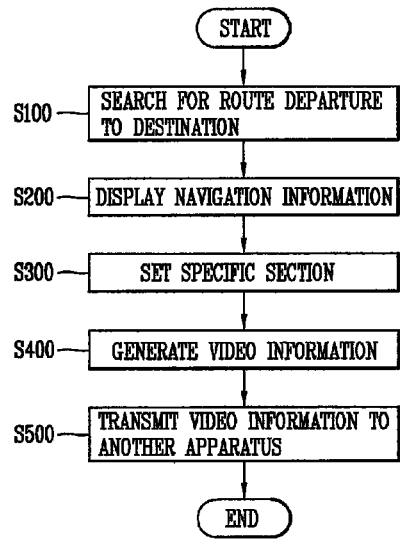
FIGS. 6 and 7 are flowcharts showing navigating methods of a navigation.
Figure 7:
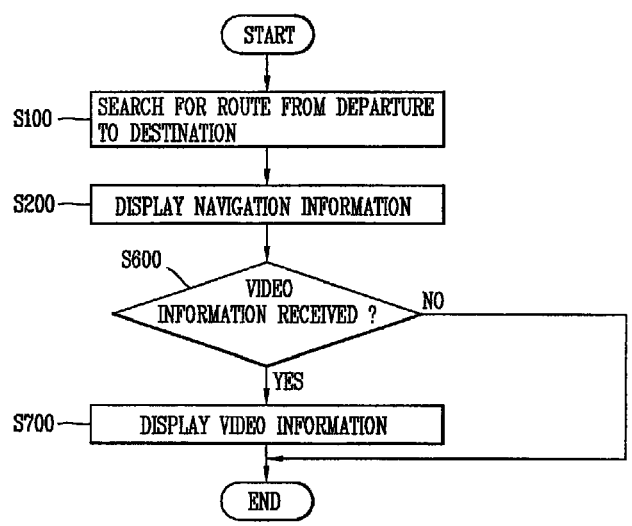

FIGS. 6 and 7 are flowcharts showing navigating methods of a navigation. FIG. 6 is a navigation method according to one implementation while FIG. 7 is a navigation method according to another embodiment. Turning to FIG. 6, a navigating method of the navigation apparatus may include searching for a route from a departure point to a destination (S100), displaying the route from the departure point to the destination on a navigation screen (S200), setting (selecting) a specific section of the navigation screen (S300), generating video information based upon navigation information relating to the set section (S400), and transmitting the video information to another apparatus via a wired or wireless communication network. Here, the construction of the apparatus will be understood with reference to FIGS. 2 to 5.

In one implementation, the user enters a departure point and a destination via the input unit 303 to search for a route from the departure point to the destination point (S100). In other implementations, the user enters only the destination to search for a route to the destination point (S100). Accordingly, the departure point and the destination are searched and a route therebetween is retrieved. Also, in some implementations, a current location of a vehicle is matched with a current map match link extracted from map data corresponding to the route from the departure point to the destination (or a current route without destination), and navigation information is generated based upon the matched result. To display the navigation information (S200), the route is displayed on the display unit 306, such as, the screen shown in FIG. 5.

The setting of the specific section (S300) is setting a specific section for generating video information therefor based upon the displayed navigation information (S200). The specific section may be one of the route from the departure point to the destination, a partial section of the route from the departure point to the destination, or part or all of a navigation screen which changes along the route from the departure point to the destination.

The generation of video information (S400) generates video information based upon navigation information corresponding to the set section. Accordingly, if a user sets a specific section via the setting portion 303a (S300), navigation information relating to the set section is generated in a video format. The video format can be various formats, such as avi, mpeg, mov and the like. The specific section may be one of the route from the departure point to the destination, a partial section of the route from the departure point to the destination, or part or all of a navigation screen which changes along the route from the departure point to the destination.

Here, the video information may also include a video outline map. That is, when a departure point and a destination are selected, a route from the departure point to the destination is selected among a plurality of routes therebetween, and the selected route is displayed on the display unit 306. If a user sets a specific section via the setting portion 303a, video information corresponding to the set section is generated. The specific section may be one of the route from the departure point to the destination, a partial section of the route from the departure point to the destination, or part or all of a navigation screen which changes along the route from the departure point to the destination. The video information may include a video outline map formed by screens including such sections.

The video outline map may be generated by consecutively storing the sections of the route for a specific time or periodically storing the sections. Alternatively, the video outline map may be generated by sensing changes of screens including the sections. In particular, screens with significant changes may be consecutively stored while screens without significant changes may be partially stored or not stored in their entirety. For instance, for the sections including screens without significant changes, such as an advancing section and the like, the video outline map is generated by storing part of the advancing screens. On the other hand, for the sections including screens with significant changes, such as intersections, curves and the like, the video outline map is generated by consecutively storing the screens. Accordingly, the user using the video information can quickly and easily acquire navigation information from the video information which is quickly reproduced at the advancing section and slowly reproduced at the curves or intersections.

Also, the video information may include audible navigation information. That is, the video information may include voice indication at a point to be guided (e.g., "Turn right" or "Be careful of sharp curve"). By providing such audible navigation information, an accurate guidance may be achieved compared to simply showing a map on a screen.

Also, the video information may include GPS information. Upon transmitting the video information including the GPS information, another system having received the video information may display navigation information conformable to a current location on a screen by utilizing the received GPS information. Also, the video information may simultaneously include two or more of the video outline map, the voice indication information or the GPS information.

The transmitting of the video information (S500) transmits the generated video information to another apparatus via a wired or wireless communication network. That is, if a user enters a video generation start command via the setting portion 303a, the video generator 308a generates video information based upon the navigation information conformable to a set section. The generated video information is then transmitted to another apparatus according to a video transmission command input via the setting portion 303a.

Here, the other apparatus or system is an apparatus for executing the video information which it has received, and may be another mobile communication terminal, another telematics terminal or another navigation apparatus. Also, the other apparatus or system may include one or more of a web server 600, mail server 700, data server 800, or information providing sensor 500. Video information transmitted to one or more of the apparatuses may be retransmitted to other systems or apparatuses connected to each of the apparatuses. For instance, when video information is transmitted to the mail server 700 for storage, users of the mail server 700 may acquire the video information from the mail server 700. Also, the video information may be transmitted directly to pre-registered (pre-assigned) other apparatus users or system users. For instance, if other apparatus or system users are pre-registered in the storage 305, the video information may be transmitted directly to the pre-registered users.

Further, examples of the wired or wireless communication networks may include a broadcast receiving module, mobile communication module, wireless internet module, short-range communication module, position information module, universal serial bus (USB), parallel or other communication means.

Turning to FIG. 7, a navigating method of the navigation apparatus may include searching for a route from a departure point to a destination (S100), displaying the route from the departure point to the destination on a navigation screen (S200), receiving video information transmitted from another apparatus (S600), and displaying navigation information based upon the received video information and GPS information of the current location. Here, the construction of the apparatus will be understood with reference to FIGS. 2 to 5. The description of the setting of the specific section (S300) to the transmitting of the video information (S500) will be understood by the aforesaid description of the previous method, so as to be omitted.

The receiving of the video information (S600) receives video information transmitted from another system or apparatus via the video receiver 308c. That is, a route is searched for at the searching for the route (S100) based upon the departure point and the destination input by the user, and navigation information is displayed based upon the searched route (S200). A current location matches with a current map match link extracted from map data corresponding to the route from the departure point to the destination (or a current route without destination) and navigation information is generated based upon the matched result. Here, it is determined whether the video information required for the navigation information has been received (S600), and if so, the received video information may be selected.

The displaying of the video information (S700) displays the video information received via the video receiver 308c on a screen via the display unit 306. That is, upon receiving the video information (S600), the video information is displayed on the display unit 306.

As described above, video information including an outline map, audible indication, GPS information, and other information is generated from a navigation screen for a set section so as to be transmitted to another apparatus, and a navigation screen corresponding to a current location is displayed based upon video information transmitted from another apparatus so as for a user to be able to easily search for a route.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather, should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A system comprising:
a first display unit of a first device;
user input controls of the first device;
a communication module configured to transmit information from a first device to a second device;
a first controller of the first device configured to:
  generate route information for a route from a departure location to a destination location, wherein the route comprises a plurality of sections,
  display the generated route information on the first display,
  receive user input through the user input controls based on the displayed route information,
  generate, in response to the received user input and based on the route information, route media in a video format, the route media comprising a sequence of screen images for the route, the first controller further being configured to generate the route media by:
    detecting that a first amount of change between screen images in a first section of the route is greater than a second amount of change between screen images in a second section of the route, and
    based on detecting that the first amount of change between screen images in the first section of the route is greater than the second amount of change between screen images in the second section of the route, storing consecutive screen images for the first section of the route and storing non-consecutive screen images for the second section of the route, wherein each screen image further includes GPS information, and
  transmit, by the communication module, the generated route media from the first device to a second device,
a second display unit of the second device; and
a second controller of the second device that is configured to:
  receive, at the second device, the route media transmitted from the first device;
  search for a playback point of the route media conformable to a current location of the second device by utilizing GPS information in the screens of the route media; and output, on the second display of the second device, the route media from the searched playback point.

2. The system of claim 1 wherein:
the first controller of the first device is configured to receive the user input by receiving a selection of a section of the route; and
the first controller of the first device is configured to generate the route media by generating route media specific to the selected section of the route.

3. The system of claim 1 wherein the first section of the route includes an intersection and the second section of the route does not include an intersection.

4. The system of claim 1 wherein the first controller of the first device is further configured to receive global positioning system information.

5. The system of claim 4 wherein the first controller of the first device is configured to generate the route media based upon the received global positioning system information.

6. The system of claim 1, wherein the first device and the second device comprise at least one of a mobile communication terminal or a telematics terminal.

7. The system of claim 1, wherein the route information comprises a navigation map and the route media comprises a video.

8. The system of claim 1, wherein, in generating the route media, the first controller is configured to detect that a first amount of change between screen images in a first section of the route is greater than a second amount of change between screen images in a second section of the route by:
detecting a first amount of change between screens in consecutive screen images corresponding to the first section of the route;
detecting a second amount of change between screens in consecutive screen images corresponding to the second section of the route; and
determining that the first amount of change is greater than the second amount of change.

9. The system of claim 1, wherein the first controller is configured to store consecutive screen images for the first section of the route by storing the entirety of a set of screen images associated with the first section.

10. The system of claim 1, wherein the first controller is configured to store non-consecutive screen images for the second section of the route by storing a first set of screen images associated with the second section and not storing a second set of screen images associated with the second section.

11. The system of claim 1, wherein the video format of the route media is at least one of an Audio Video Interleave (AVI) video format, a Moving Picture Experts Group (MPEG) video format, or a QuickTime video format.

* * * * *